June 20, 1961 E. R. SEWARD ET AL 2,989,326
ATTACHMENT AND COUPLING DEVICE
Filed May 6, 1957 4 Sheets-Sheet 1
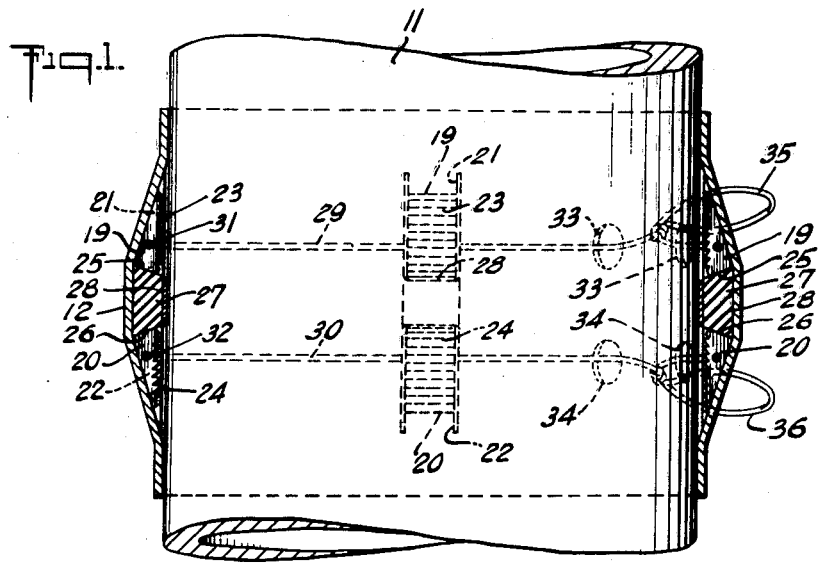
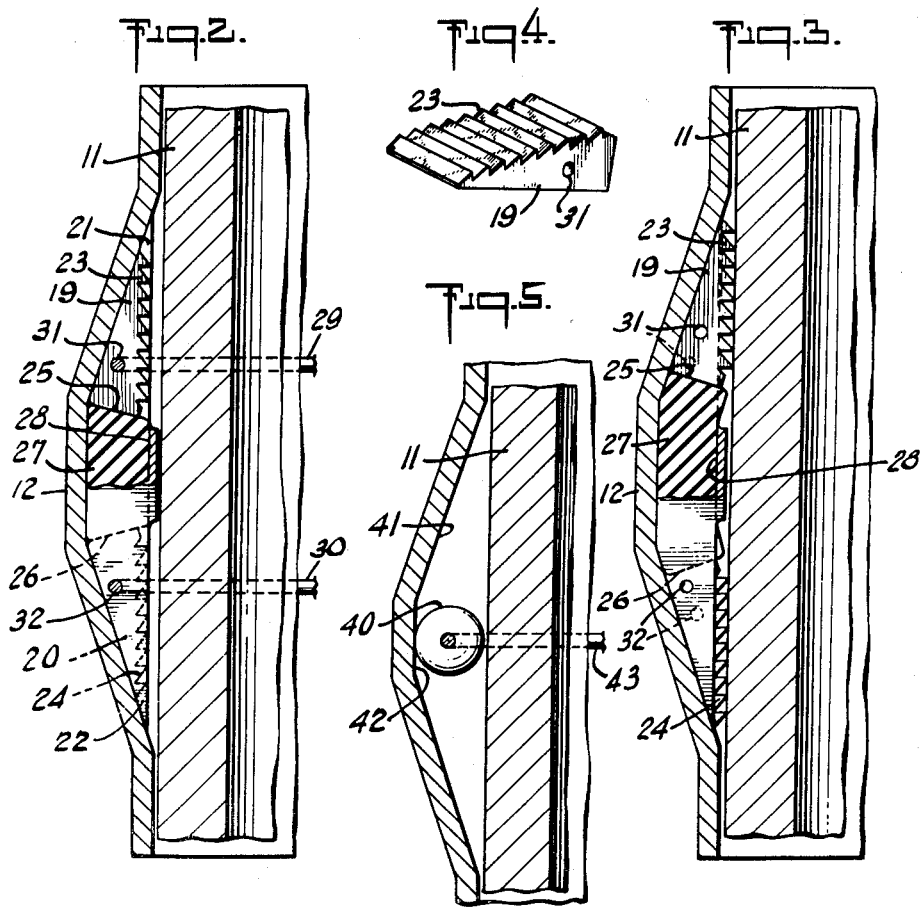

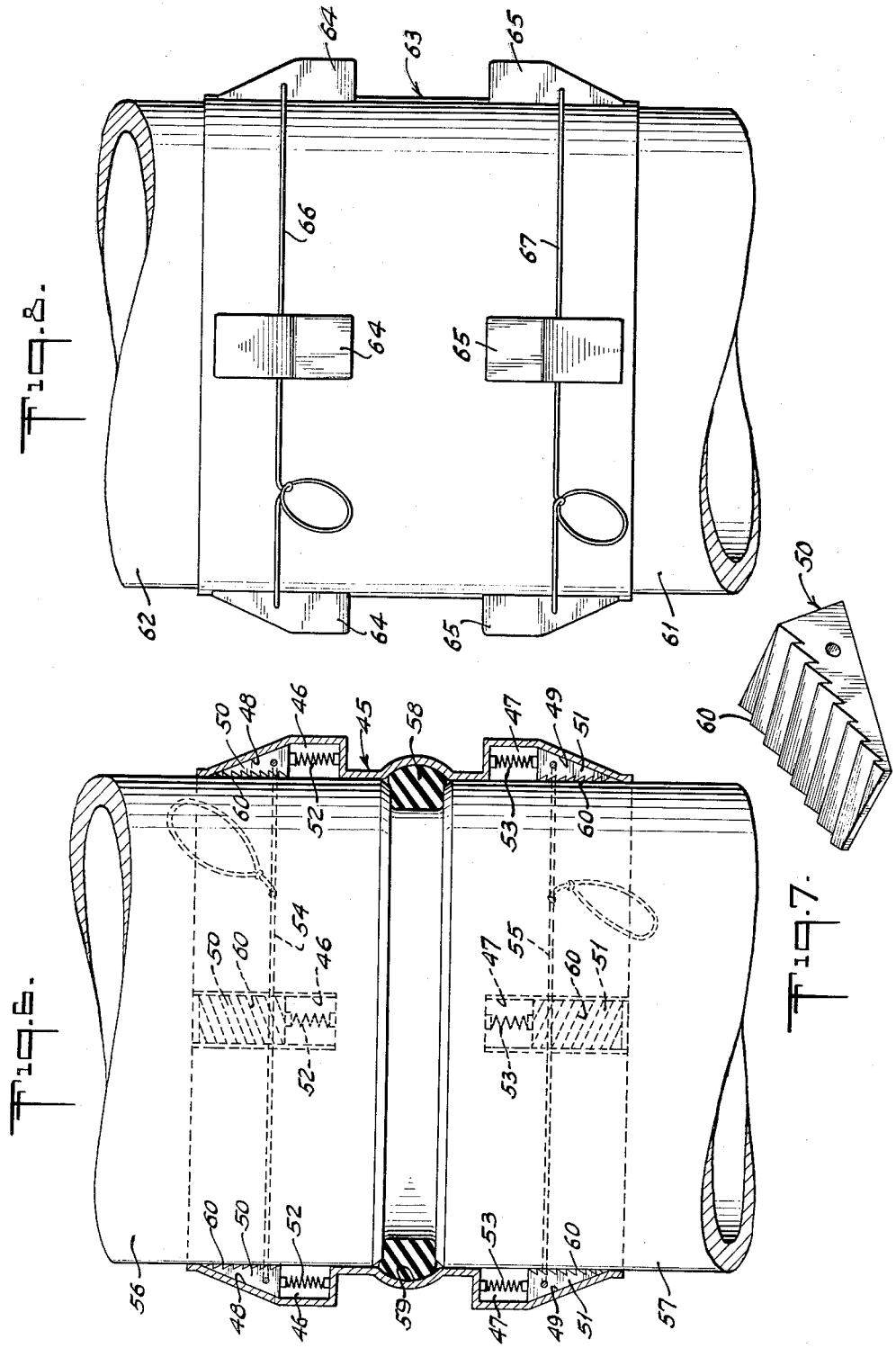

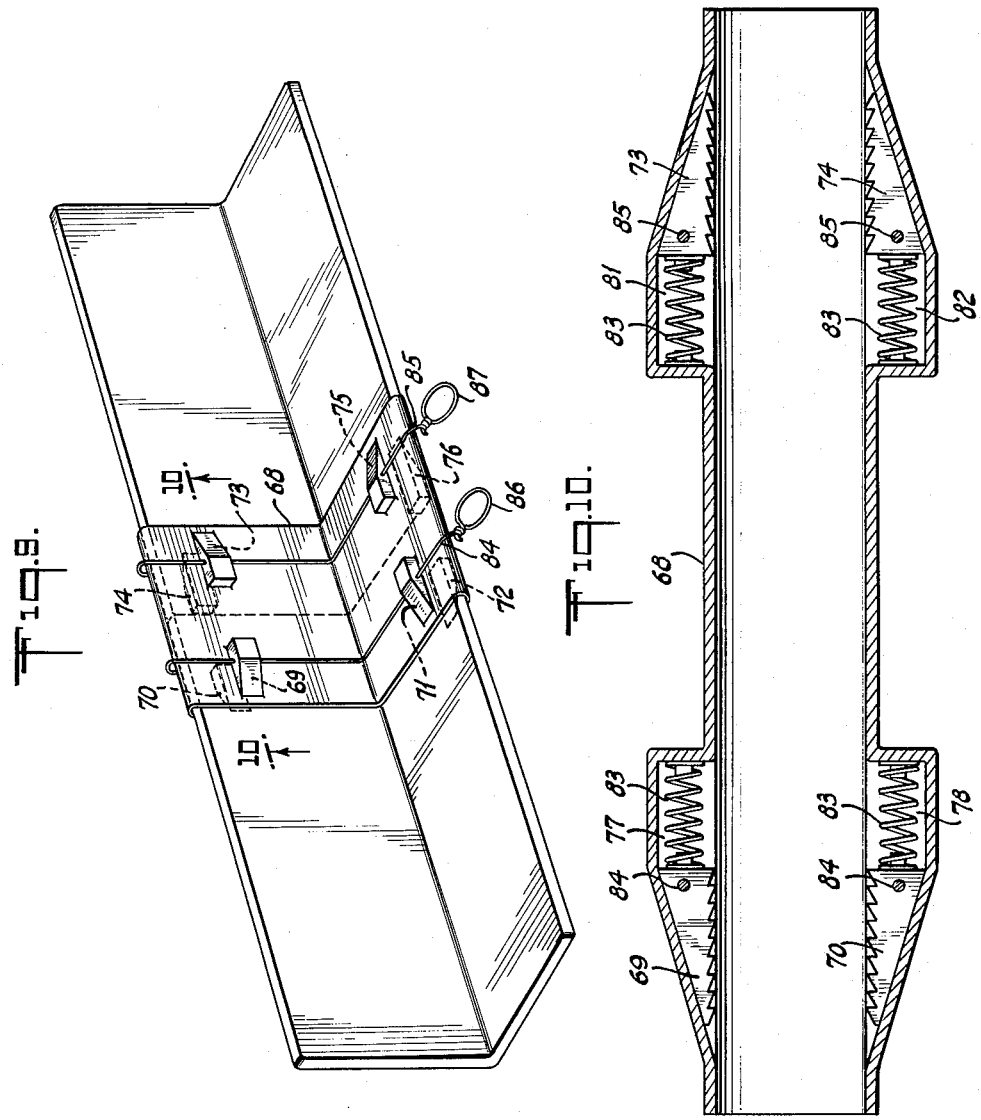

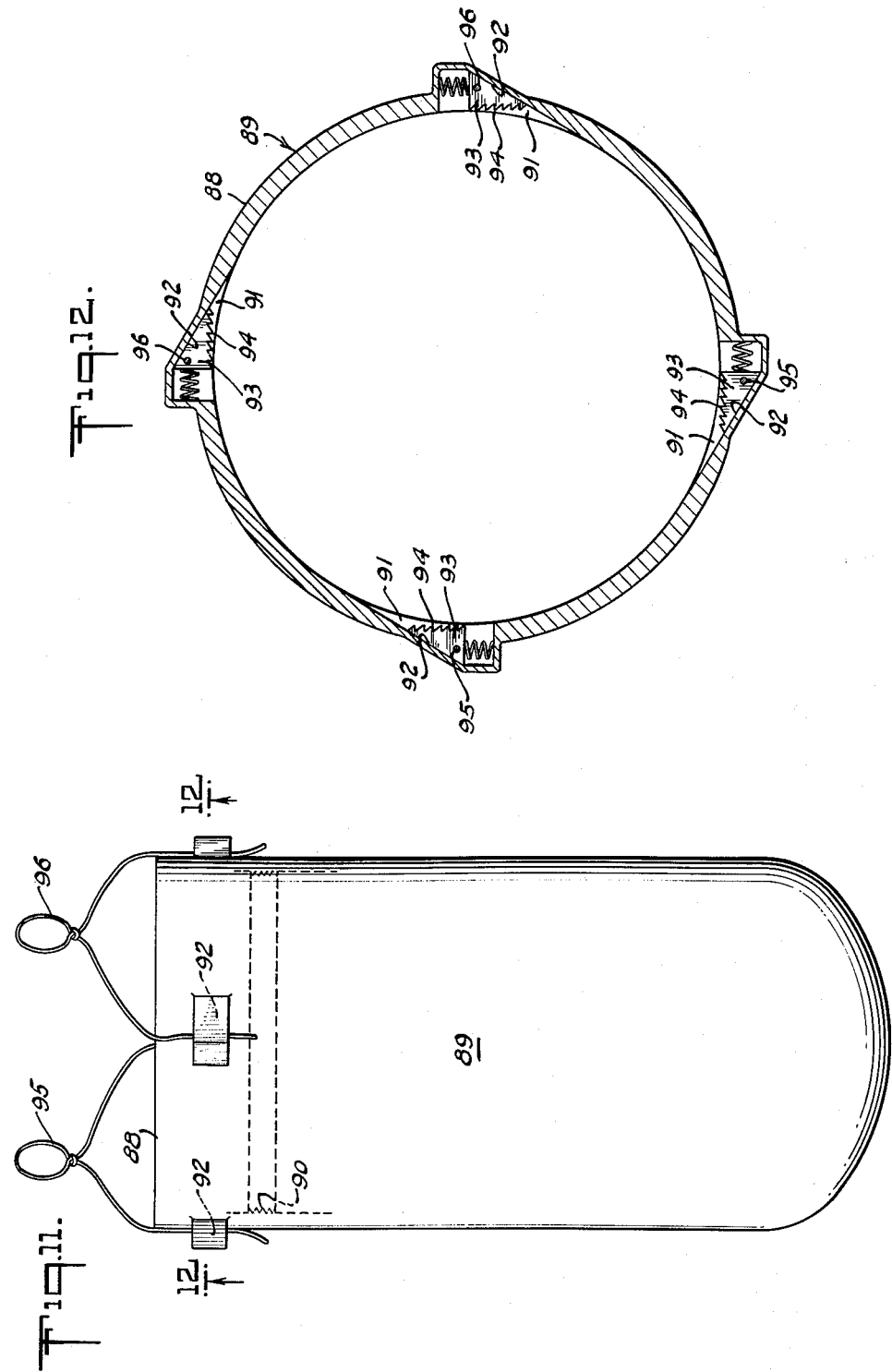

United States Patent Office 2,989,326
Patented June 20, 1961

2,989,326
ATTACHMENT AND COUPLING DEVICE
Edwin R. Seward and William C. Gainer, New Orleans, La., assignors to ASCO Automatic Specialties Corporation, New Orleans, La., a corporation of Louisiana
Filed May 6, 1957, Ser. No. 657,389
3 Claims. (Cl. 287—52)

This invention relates to an attachment and coupling device for tubes, rods, and generally cylindrical and profiled bodies and strings thereof, which device has sliding fit along said bodies and can be rigidly connected thereto in any required position.

The principal object of the invention is to provide a sleeve-like attachment with built-in coupling means acting either in one direction or in two opposite directions.

Another object of the invention is the arrangement of releasable locking means which hold the coupling means in inactive position for shifting the attachment along the string into the required position, and can be, for instance manually, released to bring the coupling means into active position for rigidly connecting the attachment to the string.

A further object of the invention is to provide, inside the sleeve-like attachment, two sets of oppositely to each other functioning coupling means so spaced from each other that the attachment acts as a coupling between two aligned strings of tubes, rods, and the like, inserted into the sleeve from above and below, respectively.

Yet another object of the invention is to provide the sleeve-like body of the attachment with one-sided coupling means arranged in peripheral direction to prevent relative rotation of the attachment to the string in one direction, for instance, to serve as screw locking device.

Other objects and advantages will be apparent from a consideration of the specification and claims.

The coupling means according to the invention are formed as a set of internal recesses in a collar-like attachment with inclined rear walls co-operating with a set of locking members freely movable in these recesses and being forced, by a slight relative movement, into the narrowing gap between the attachment and the surface of the tube or other member to which they are coupled; preferably the coupling means forms a twin set of internal recesses in the sleeve-like attachment with oppositely inclined rear walls co-operating with locking members freely movable axially in these recesses to provide a rigid connection between attachment and tube in both axial directions. We provide manually controllable means for keeping the locking members in inactive position in their recesses while the attachment is positioned, and for releasing the locking members to activate the coupling. In a preferred embodiment of our invention, said control means are wires threaded through circularly arranged guide holes of the attachment and aligned holes of the locking members, the wires being provided with protruding loops to pull them out of their holes for releasing the locking members.

The locking members of the coupling are, for instance, wedge-like bodies corresponding to the wedge-like shape of the recesses in the attachment, whereby the inner surfaces of these wedge-like bodies contacting the string are preferably provided with ratchet teeth to increase the locking effect.

Spring means are provided in the enlarged portions of the recesses and force the locking members, after they have been released, into locking position. Said spring means may be rubber blocks, abutting, with their inner faces, the bases of the twin sets of the locking members.

In the accompanying drawing:

FIG. 1 shows in vertical section a sleeve-like attachment according to the invention with the coupling means and manually controllable means in inactive position;

FIG. 2 shows, partly in section, the locking members of the coupling of FIG. 1 in inactive position;

FIG. 3 is a similar section showing the locking members released and in activated position;

FIG. 4 is a perspective view of one of the locking members;

FIG. 5 is a vertical section showing another embodiment of a coupling means according to the invention;

FIG. 6 is a vertical section through another embodiment of the attachment formed as coupling and sealing device between the aligned ends of two tube strings;

FIG. 7 shows in perspective one of the special coupling wedges of the embodiment of FIG. 8;

FIG. 8 shows in elevation a similar coupling as shown in FIG. 6, but without sealing means;

FIG. 9 shows in perspective, and

FIG. 10 in a section along line 10—10 of FIG. 9 a coupling device for two aligned profile irons (angle irons);

FIG. 11 represents in elevation, and

FIG. 12 in a section along line 12—12 of FIG. 11 an embodiment of the invention where the device is used to attach a float shoe to the end of a string of casing in oil drilling operations.

The embodiment illustrated in FIGS. 1-4 comprises two sets of oppositely arranged wedge-like locking members 19, 20, slidably positioned in two sets of corresponding recesses 21, 22 inside carrier 12. The inner vertical faces of members 19, 20 contact directly the outer surface of the string 11 and are provided with ratchet teeth 23, 24, for better gripping action.

The bases 25, 26 of wedges 19, 20 are abutted against springs, preferably rubber blocks 27, arranged in the enlarged middle portion 28 of recesses 21, 22. When springs 27 are held compressed and the wedge-like members are held abutted against them, no coupling between carrier sleeve 12 and casing 11 is effected. But when spring 27 is released, as well as members 19, 20, which then may slide into their recesses 21, 22, the rigid coupling is performed automatically.

To serve as controlling means for wedges 19, 20 and simultaneously for springs 27, wires 29, 30 are threaded through holes 31, 32, in wedges 19, 20, and aligned guide holes 33, 34 provided in the side walls of recesses 21, 22. In this position of the wires 29, 30, the wedges 19, 20 and compressed springs 27 are held inactive. But when wires 29, 30 are pulled out, which can easily and rapidly be done by means of protruding loops, 35, 36, the coupling means is released and slips into coupling position. FIGS. 2 and 3 show, respectively, the two positions of the coupling.

In the embodiment shown in FIG. 5 one set only of locking members, formed as balls or rollers 40, is arranged in a corresponding set of symmetrically tapered recesses 41. When these balls or rollers 40 are held in the wider middle portion 42 of their recesses, they do not contact the outer surface of string 11 and are therefore inactive. But when freed, they enter into coupling position in both the downward and upward movement of the string. The controlling means for members 40 is again a wire 43, preferably provided with an external loop and threaded through holes of members 40 and aligned holes inside sleeve 12.

In the embodiment of FIG. 6, the attachment comprises a sleeve-like body 45, with two sets of axially spaced internal recesses 46, 47, which are provided with inclined rear walls 48, 49. Wedge-like coupling members 50, 51, are slidingly arranged in these recesses under the action of springs 52, 53, which tend to drive the wedges into locking position. As controlling means for the wedges 50, 51, we use again wires 54, 55, which are threaded through holes in the wedges themselves and aligned holes in the side walls of the recesses 46, 47, in such a position that the wedges 50, 51, are secured in the wider part of the recesses against the pressure of their springs. If these wires 54, 55 are pulled out, the spring pressure forces the wedges into the narrower part of their recesses and thereby into locking position.

As shown in FIG. 6, the ends 56, 57 of two aligned pipes are inserted into the attachment 45 from opposite directions. A sealing gasket 58 arranged in a ring-like recess in the middle of the attachment between the set of recesses 46, 47 abuts the butt ends of the pipe portions 56, 57. To insure an appropriate pressure of the butt ends against the sealing gasket 58, the wedges 50, 51 are provided at their tube contacting faces with ratchet-like teeth 60 (FIG. 7). The teeth of the two sets of wedges 50 and 51 are cut with opposing (right and left hand) lead as in a turn buckle. If the attachment, after releasing the wedges, is turned into thread closing direction, for instance with a pipe wrench, then the butt ends of the pipe ends are tightly pressed against the correspondingly compressed sealing gasket 58.

A simplified form of a similar coupling for pipe and rod ends is shown in FIG. 8. The pipe or rod ends 61, 62 are coupled by attachment 63, again provided with two sets of oppositely arranged coupling wedges located in recesses 64, 65 of the sleeve body 63 and releasable by means of the triggering wires 66, 67. Such a coupling may be used for structural purposes, for instance in the assembly of pontoon bridges, buildings, irrigation, and the like.

The structural angle-iron coupling of FIG. 9 and FIG. 10 comprises an angular sleeve body 68 provided with two sets of oppositely arranged locking means. One set of locking means is formed by two pairs of wedges 69, 70 and 71, 72, the other set of axially opposed pairs of wedges 73, 74, and 75, 76.

These wedges, for instance 69, 70, and 73, 74, are slidingly arranged in recesses 77, 78, and 81, 82 of the sleeve body. The rear walls of these recesses are again oppositely inclined and spring means 83 tend to push the wedges into the narrowing parts of the recesses. The inactive position of the wedges is again secured by triggering wires 84, 85 which can be pulled out by loops 86, 87, at their free ends.

The coupling of FIGS. 9 and 10 is particularly useful when instant installation is needed for construction without welding or bolting, especially in remote places where power and tools are not available.

The embodiment of FIGS. 11 and 12 shows the attachment of the invention formed as a shoe or cap to be secured to the end of a string of casing. For this purpose, the upper sleeve-like portion 88 of the cap body 89 is provided with internal threads 90 to be screwed into the threaded end of a string of casing.

Above threads 90 there are arranged internal recesses 91 with inclined rear walls 92 but extending in peripheral direction instead of axial direction. Inside these recesses are again located wedge-like coupling members 93, also extending peripherally and preferably provided with ratchet-like teeth 94 at their tube-contacting face. Looped wires 95 and 96, inserted through holes in coupling members 93 and aligned holes in the side walls of recesses 91 hold the coupling members in retracted position. After screwing the cap 89 to the end of the string of casing, wires 95 and 96 are pulled out so that the coupling members, for instance under spring pressure, are activated and prevent a rotation and thereby an unscrewing of the shoe or cap.

It will be seen that the invention provides a simple and effective means to eliminate welding in many fields and has the advantage of ready disassembly. It is to be understood that we do not wish ourselves to be limited to the specific details and applications set forth above, but that the invention is limited only by the scope of the appended claims.

This application is a continuation in part of our application, Serial No. 616,023, filed October 15, 1956, for a Wall Cake Cutter.

We claim:

1. An attachment to an elongated structural member comprising a ring surrounding said member and having at least one set of internal circumferentially spaced recesses having ends tapering against said member, axially movable locking members in said recesses, said locking members coupling the attachment to the structual member when forced into the tapered end of said recesses, spring means biasing said locking members towards the tapered ends of said recesses, guide holes in the walls of said recesses and holes aligned with said guide holes in said locking members, and a wire threaded around the ring through said guide holes and said aligned holes, said wire holding said locking members in inactive position and releasing simultaneously all thus held members for coupling action when withdrawn.

2. A device as defined in claim 1, comprising a twin set of said internal recesses having oppositely inclined rear walls cooperating with said locking members.

3. A device as claimed in claim 1 comprising recesses tapered at both ends, locking members in each of said ends, and separate wires for holding all the locking members at the one end and all the locking members at the opposite end of said recesses.

References Cited in the file of this patent

UNITED STATES PATENTS

| | | |
|---|---|---|
| 370,744 | Mixer | Sept. 27, 1887 |
| 689,264 | Whitehouse | Dec. 17, 1901 |
| 1,712,108 | Goeller | May 7, 1929 |
| 2,217,978 | Becker | Oct. 15, 1940 |
| 2,812,200 | Yeargan | Nov. 5, 1957 |